April 8, 1969

JAMES E. WEBB
ADMINISTRATOR OF THE NATIONAL AERONAUTICS
AND SPACE ADMINISTRATION
VARACTOR HIGH LEVEL MIXER 3,437,935

Filed Oct. 26, 1966

INVENTORS
Nicholas J. Penque &
Harold A. Rosen

BY

Robert F. Kempf

ATTORNEYS

INVENTORS
Nicholas J. Penque &
Harold A. Rosen
BY
[signature]
Robert F. Kempf
ATTORNEYS United States Patent Office 3,437,935

Patented Apr. 8, 1969

3,437,935

VARACTOR HIGH LEVEL MIXER

James E. Webb, Administrator of the National Aeronautics and Space Administration with respect to an invention by Nicholas J. Penque, Torrance, and Harold A. Rosen, Santa Monica, Calif.

Filed Oct. 26, 1966, Ser. No. 590,159
Int. Cl. H04b *1/26*
U.S. Cl. 325—446 11 Claims

ABSTRACT OF THE DISCLOSURE

A stripline mixing circuit wherein a primary frequency signal is applied to a hybrid which splits the signal and applies each of the resultant signals through a high pass filter to a varactor mixing diode. Secondary frequency signals are applied through low pass filters to each of the diodes. The heterodyned signals are reflected back through the high pass filters to the hybrid.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

The invention relates generally to electronic mixers, and more particularly to a high level electronic mixer operable at microwave frequencies and incorporating varactor diodes as the mixing elements.

Mixers in general, are electronic systems wherein signals of a primary and a secondary frequency are combined so as to generate output signals at still different frequencies. The output signal contains components at two additional new frequencies. These new frequencies, or sidebands, are the sum and difference of the two original frequencies. Specifically, if $\beta$ represents the primary frequency and $\alpha$ the secondary frequency, the new frequencies are $\beta+\alpha$ and $\beta-\alpha$. One or both of these sideband signals may be selected by suitable filtering. Mixers for obtaining signals in this manner are advantageous in many electronic transmission systems. For example, it is desirable, for optimum antenna performance, to obtain two signals closely related in frequency when one antenna is to be used for transmitting information on two channels. A mixer provides a simple means for obtaining transmission signals at these two closely related frequencies. Further, in some electronic systems it is easier to obtain a signal at a desired complex frequency by mixing two other signals of less complexity than to obtain the desired signal directly from a signal generator.

Previously developed electronic mixers have several disadvantages. One prior art device has utilized mechanical type phase shifters to generate sidebands. However, mechanical phase shifters are limited to low frequencies, generally around 500 cycles per second. Further, they are of relatively large size and weight. These limitations have been somewhat overcome in recent years by the development of electronic mixers which are frequency limited only by the bandwidth at which the transmission line components are operated. However, previously developed electronic mixers also have disadvantages in that they generally have poor conversion efficiency due to the employment of crystal rectifiers. For example, an output power level in the order of a few tenths of a milliwatt is the maximum obtainable in many types of conventional electronic mixers.

The disadvantages of such conventional mixers, particularly those of bulk, weight, low conversion efficiency and limited power output levels, have made them unsuitable for application in certain environments. An example of this environment is the utilization of a mixer in the transmission system of a spacecraft. A spacecraft is severely limited as to the size and weight of the components that can be carried aboard. This is primarily due to the limitations placed on size and weight by state of the art launch systems. Further, in a spacecraft the power available is determined by the power source, which normally is a plurality of storage batteries having limited capacity. Consequently, a critical factor in the design of a space vehicle is the efficiency of its electronic components and systems, including the conversion efficiency of the mixer. In addition, the spacecraft is located a considerable distance from receiving stations on the earth's surface. It is therefore, advantageous that the mixer used in the conversion system of the spacecraft be capable of providing a power output level in excess of the few tenths of a milliwatt that present mixers provide. This will, for example, result in greater driving power for amplifying devices such as traveling wave tubes that are utilized to transmit signals over long distances from the spacecraft to the earth. The complexity of the electronic subsystem is also of significant importance when a mixer is utilized in the spacecraft. A simple design results in a system which is less susceptible to failure than is a system which has complex components and design features. However, even though the invention has particular use in a spacecraft environment it will be appreciated that it is not limited to spacecraft use. The invention is useful in any electronic environment where a mixer having high efficiency as well as low weight and size is desired.

It is an object of the present invention to provide a novel system for combining a primary frequency and a secondary frequency to provide either or both of the sidebands of the primary frequency.

Another object of the invention is to provide a mixer which is completely electronic and of small size, light weight, and high power.

A further object of the invention is to provide a sideband generator or mixer having a high conversion efficiency and a high power output but of simple design and construction.

In accordance with a principle of the invention the foregoing objects are accomplished by applying a primary frequency and secondary frequency to a pair of varactor diodes connected in back-to-back relationship through a stripline network. Specifically, the invention contemplates applying a primary frequency signal to a stripline hybrid which may be composed of four branches in an essentially square or rectangular relationship. The hybrid splits the signal and provides two outputs which are 90° out of phase. These signals are applied to parallel striplines each including a high frequency stripline filter, with one stripline being a quarter of a wave length longer than the other, resulting in the signals being in-phase at the ends of the parallel striplines. Coupled to the end of each parallel stripline is a varactor diode, with the two diodes connected in back-to-back relationship. Secondary frequency signals are applied, via striplines and through low pass stripline filters, to each of the parallel striplines coupling the primary frequency signal to the varactor diodes. A heterodyning effect occurs which generates the aforementioned sidebands. The sidebands are reflected back down the parallel striplines, through the high frequency filters, to the stripline hybrid. The output, consisting of the two sidebands, is then taken from the hybrid.

It will be appreciated by those skilled in the art that the foregoing provides a simple electronic mixer having good conversion efficiency and high power, and which is compact and light weight such that it may be readily incorporated in on-board spacecraft communication systems.

Other objects and many of the attendant advantages of this invention will become more clearly appreciated as the same becomes better understood by reference to the following detailed description when taken in conjunction with the accompanying drawings, wherein.

Prior to discussing the figures it is considered worthwhile to review some of the characteristics of the varactor diode and the stripline circuits utilized by the invention in the preferred embodiments herein disclosed. An example of a stripline circuit is set forth in U.S. Patent 2,774,046 to Arditi et al. and is basically a microwave transmission line comprising two conductors separated by a layer of dielectric material. When a signal is applied to one end of the conductors it propagates down the stripline and may be detected or utilized in an electronic circuit connected to the other end. The primary advantage of stripline resides in the fact that it can be made compact, light weight and in a variety of physical shapes without any significant increase in insertion loss. In recent years stripline circuits of the foregoing and similar natures have become well known to persons skilled in the art and have been produced and utilized in various manners. Consequently, it should be understood that any stripline which may be utilized in the required manner is within the scope of the invention even though not specifically discussed herein.

The varactor diodes utilized by the instant invention are basically semiconductor elements which are capacitively variable in accordance with the applied voltage, i.e., voltage variable capacitors. Various types of varactor diodes which can be utilized by the invention are available commercially. Therefore, any varactor diode that will perform the desired function may be utilized.

Figure 1:
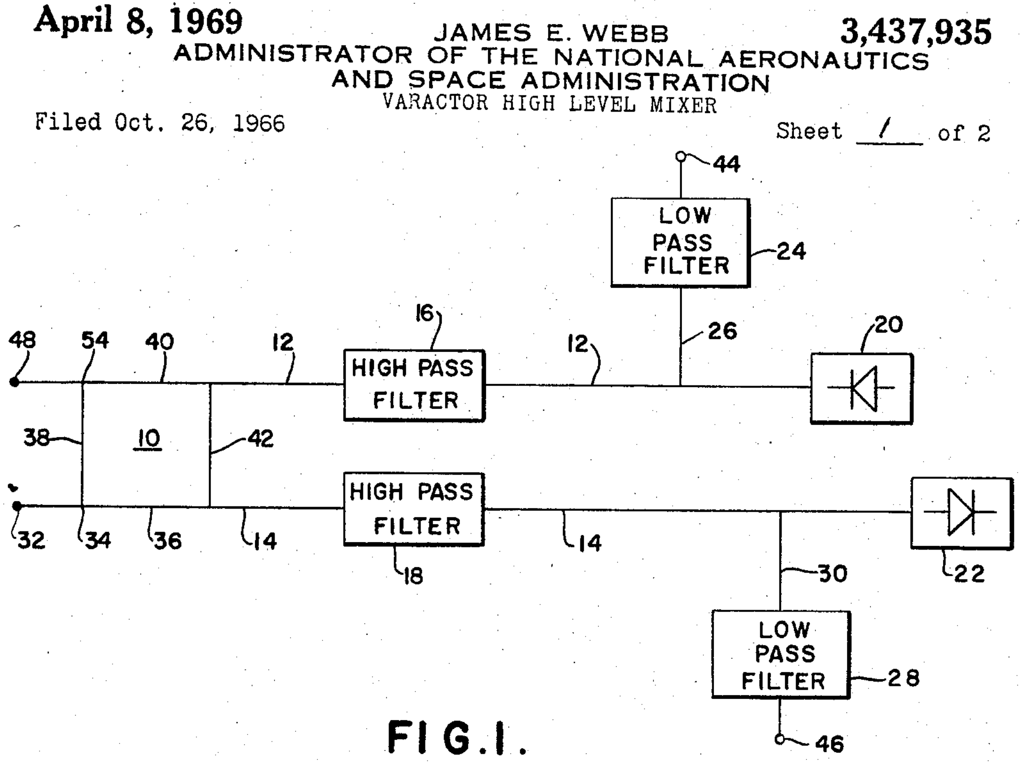
FIGURE 1 is a line diagram of one embodiment of the instant invention.

Referring now to FIGURE 1, the mixer of this invention is illustrated in the line diagram as including a branch-line hybrid 10, a pair of parallel stripline circuits 12, 14, including a high pass filter 16, 18 in each stripline, and a pair of varactor diodes 20, 22 connected each at one end of the parallel striplines in a back-to-back relationship. Another stripline 26 couples a first low pass filter 24 to the first parallel stripline 12 at a point between the first high pass filter 16 and the first varactor diode 20. A second low pass filter 28 is similarly coupled between the second high pass filter 18 and the second varactor diode 22 via still another stripline 30.

In operation, the primary signal is applied to an input terminal 32 and thence to input junction 34 of branch-line hybrid 10. Branch-line hybrid 10, in turn, is comprised of branch lines 36, 38, 40 and 42, connected in an essentially square or rectangular relationship. With proper selection of line lengths for the branch lines a signal applied to junction 34 is passed through branch-line hybrid 10, being split in power level, and is supplied to parallel striplines 12 and 14 with equal power levels but with a 90° phase difference. Because of the isolation characteristics of branch-line hybrid 10 the primary signal supplied to input junction 34 does not appear directly at the output junction 54 between branch lines 38 and 40. The divided primary signal propagates down the first and second parallel striplines 12 and 14, passing through the high pass filters 16 and 18 included in the parallel striplines, and thence to the pair of varactor diodes 20, 22. It should be noted that the section of stripline between the second high pass filter 18 and the second varactor diode 22 is ¼ wavelength longer than the stripline between the first high pass filter 16 and the first varactor diode 20. This longitudinal difference compensates for the phase shift between the signals applied to the parallel striplines and results in the varactor diodes receiving in-phase signals.

A secondary frequency signal is applied to the first low pass filter 24 at its input terminal 44 and is propagated via the stripline 26 coupling the first low pass filter to the first stripline 12. Upon reaching the first stripline 12 the secondary frequency signal is split and propagates toward the first varactor diode 20 and the first high pass filter 16. However, the first high pass filter 16 acts to block the secondary frequency signal, resulting in the signal only affecting the first varactor diode 20. In a similar manner, a secondary frequency signal at the same frequency and phase is applied to the second low pass filter 28 at its input terminal 46 and flows via the stripline interconnection 30 between the second low pass filter 28 and the second stripline 14. This signal is applied to the second varactor diode 22 and is blocked by the high pass filter 18. It should be noted that the low pass filters 24, 28 will block the primary signal from being passed back through to the secondary frequency signal source.

By connecting the varactor diodes in a back-to-back relationship a heterodyne effect occurs, resulting in signals being reflected back down to the parallel stripline 12, 14. These signals will include the high and low sidebands of the primary frequency applied to the system at the input terminal 32. The reflected sidebands are passed by the high pass filters 16, 18 but are rejected by the low pass filters 24, 28, thereby reaching the branch-line hybrod 10. By virtue of the electrical path and phase differences the sidebands are cancelled at the input junction 34. However, the signals are re-enforced at the output junction 54 between the second and third branches 38, 40 of the branch line hybrid 10. The output terminal 48 is coupled to this output junction. It will be appreciated by those skilled in the art, that external biasing is necessary for the operation of the varactor diodes, however, this is conventional and may be applied in accordance with standard methods as are well known in the art.

Figure 2:
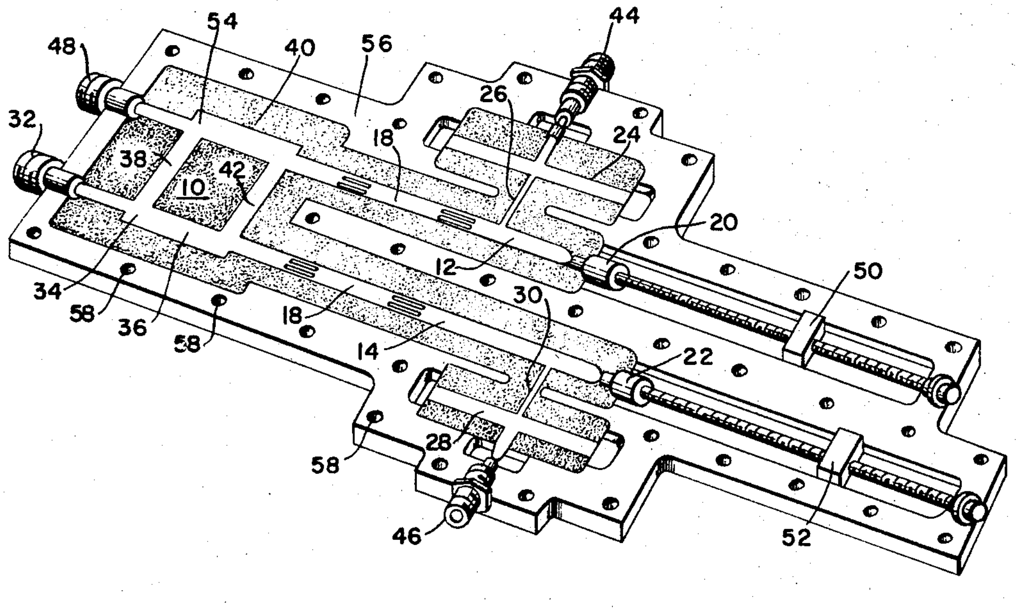
FIGURE 2 is an internal view, in perspective, of a preferred embodiment of the instant invention.

The foregoing description is illustrative of a simple electronic mixer whose simplicity will be better appreciated when considered in conjunction with FIGURE 2 which illustrates one structural embodiment of the instant invention wherein similar reference numerals are use for ease of understanding. A primary signal is supplied at the input terminal 32 of the branch-line hybrid 10 which is split, as set forth above, and applied to two parallel striplines 12, 14 after passing through two high pass filters 16, 18. The output from the hybrid is propagated down the striplines to the first and second varactor diodes 20, 22. As discussed above the parallel striplines have a ¼ wavelength difference in length which is necessary to compensate for the 90° difference in output signals from the branch-line hybrid 10. A secondary frequency signal is applied to terminals 44, 46 and passes through the low pass filters 24, 28. The low pass filters are coupled via the two coupling striplines 26, 30 to the parallel striplines 12, 14. In addition, a first tunable shorting plug 50 is coupled to the first varactor diode 20 and a second tunable shorting plug 52 is coupled to the second varactor diode 22. The two tunable shorting plugs 50, 52 may be varied over a selected frequency range to optimize the output level of varactor diodes 20 and 22.

Figure 3:
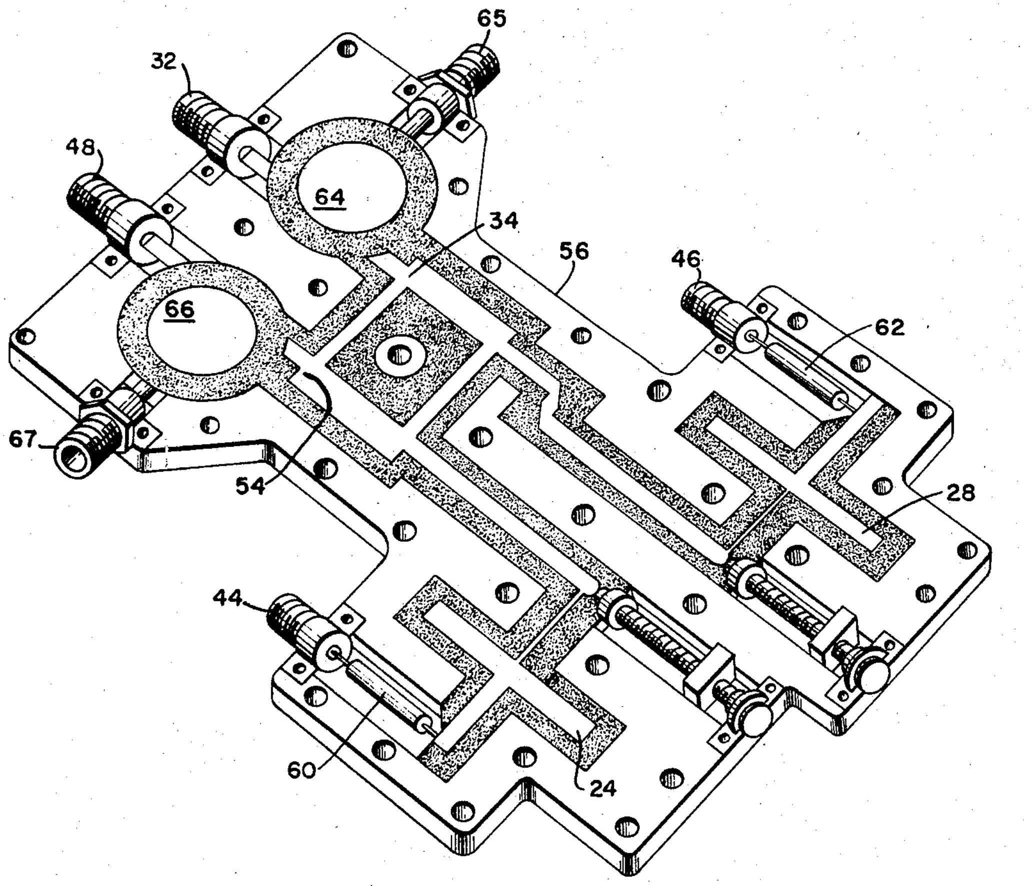
FIGURE 3 is an internal view, in perspective, of an alternate preferred embodiment of the invention including additional components that enhance some of its advantages.

FIGURE 3 illustrates an alternate embodiment of the invention similar to FIGURE 2, but including additional components mounted in the case 56 containing the structure of the invention. Although the physical arrangement of components has been modified somewhat, like numbered components function in the same manner as in FIGURE 2. In particular, the input terminal (32) receiving the primary signal is associated with the longer of the two parallel striplines and the output is obtained from the terminal (48) associated with the shorter of the two parallel striplines. The additional components, as subsequently discussed, provide further enhancement of the invention's advantages of compactness and light weight by being mounted in case 56 and incorporating the stripline components thereof.

Specifically, FIGURE 3 includes a first isolating resistor 60 mounted between the first low pass filter 24 and its input terminal 44. Similarly, a second isolating resistor 62 is mounted between the second low pass filter 28 and its input terminal 46. These isolating resistors suppress multiple reflections of harmonics that may be produced by the varactor diodes, thus preventing oscillations which could give rise to undesired spurious responses. Further, FIGURE 3 includes a first circulator 64 and a second circulator 66. The first circulator 64 is connected between the input junction 34 of the branch-line hybrid 10 and the input terminal 32. The second circulator 66 is connected between the output junction 54 of the branch line hybrid 10 and the output terminal 48. Since circulators are generally three-port devices having a third terminal (other than input and output), each circulator 64 and 66 is also provided with terminals 65 and 67, respectively, which may receive a matched resistive load. This arrangement allows access to the circulators for tuning and adjustment during assembly. These circulators are also included for isolation purposes and provide isolation between the respective input and output systems to which they are connected. It will be appreciated that the inclusion of the isolating resistors 60 and 62, and the circulators 64 and 66 provide for an overall system which is small in size and compact over the embodiment of the invention illustrated in FIGURE 2, where these elements, if utilized, would be mounted exterior to the case 56 enclosing the invention. For example, the embodiment of the invention illustrated in FIGURE 3 has been constructed with a length of 5.1 inches, a width of 3.7 inches a thickness of 0.5 inch, and a weight of 2.9 ounces. Hence, this item is readily adaptable for utilization in a spacecraft or other environment requiring compactness, light weight, and high efficiency.

In the actual structure for use in a spacecraft or the like, the embodiments of the invention illustrated in FIGURES 2 and 3 are mounted in a case 56 and have a cap structure (not shown) fixedly attached thereto by bolts mounted through bolt holes 58.

It is apparent from the foregoing detailed description that the overall system is simple. The branch line hybrid acts to isolate the primary signal from the output, to split the input signal for application to the parallel stripline circuits and to pass the returning sidebands as discussed above. Hence, thte invention is a double sideband suppressed carrier device. If single sideband operation is desired the undesired sideband can be suppressed by conventional filtering systems. It will be appreciated that the overall system is suitable for operation at microwave frequencies because the components used will operate in that frequency range. The utilization of varactor diodes and a low loss stripline circuitry results in an extremely light weight, compact mixer which may be adopted to numerous convenient configurations without any significant increases in line loss. A conventional mixer results in higher losses both through the use of standard electrical connections, such as press or solder fit, and through the use of standard high loss electronic high and low pass filter circuits. Further, it will be appreciated, the interconnections to the instant invention are simple utilizing the conventional plumbing connections illustrated at the input and output terminals as well as the intermediate frequency connection terminals in FIGURES 2 and 3.

Obviously, numerous modifications and variations of the present invention are possible in light of the above teachings. For example, the varactor diodes are illustrated in one phase relationship, and it is obvious that these can be interchanged in the opposite polarity relationship. It is only required that they be connected in a back-to-back arrangement. It is therefore, to be understood that within the scope of the appended claims, the invention may be practiced otherwise than as specifically described herein.

What is claimed is:

1. An electronic mixer for generating sidebands by combining two electronic signals comprising:

signal splitting means for splitting an electronic signal into two signal outputs and adapted for connection to a first source of electronic signals, said signal splitting means also adapted for connection to an output terminal;

first filtering means connected to one signal output of said signal splitting means for filtering one output of said signal splitting means;

second filtering means connected to the second signal output of said signal splitting means for filtering the second output of a said signal splitting means;

first nonlinear impedance means for combining electronic signals having two terminals of opposite polarity;

second non-linear impedance means for combining electronic signals having two terminal of opposite polarity;

first connecting means for connecting the output of said first filtering means to said first nonlinear impedance means for combining electronic signals;

second connecting means for connecting the output of said second filtering means to said second nonlinear impedance means for combining electronic signals;

said first filtering means being connected to a terminal of one polarity of said first nonlinear impedance means for combining electronic signals and said second filtering means being connected to a terminal of the opposite polarity of said nonlinear impedance second means for combining electronic signals;

third filtering means for filtering electronic signals and having an input adapted for connection to a source of electronic signals;

the output of said third filtering means connected to the same terminal of said firrst nonlinear impedance means for combining electronic signals as said first filtering means;

fourth filtering means for filtering electronic signals and having an input adapted for connection to a source of electronic signals; and the output of said filtering means connected to the same terminal of said second nonlinear impedance means for combining electronic signals as said second filtering means;

whereby, when a first electronic signal of one frequency is applied to said signal splitting means and a second electronic signal of a second frequency is applied to said third and fourth signal filtering means the signals are combined, by said first and second non-linear impedance means for combining electronic signals in a heterodyne manner and the sidebands of the first signal are reflected back through the first and second filtering means to the output terminal of the signal splitting means.

2. Apparatus set forth in claim 1 wherein:
said signal splitting means comprises a hybrid circuit.

3. Apparatus set forth in claim 2 wherein:
said hybrid circuit is a stripline hybrid.

4. Apparatus set forth in claim 3 wherein:
said first and second filtering means are stripline filters.

5. Apparatus set forth in claim 4 wherein:
said first and second connecting means are parallel striplines.

6. Apparatus set forth in claim 5 wherein:
said first stripline connecting means is longer than said second stripline connecting means by an amount equal to one quarter of the wavelength of said first electronic signal.

7. Apparatus set forth in claim 6 wherein:
said third and fourth filtering means are stripline filters.

8. Apparatus set forth in claim 7 wherein:
said first and second non-linear impedance means for combining electronic signals comprises varactor diodes.

9. An electronic mixer comprising:

a branch-line hybrid consisting of two sets of parallel striplines in a substantially rectangular relationship forming four junctions which are designated in a clockwise direction;

the first of said four junctions of said branch-line hybrid adapted for connection to a signal source generating a Primary Frequency signal;

the second of said four junctions of said branch-line hybrid adapted for connection to an output terminal;

a first high pass filter consisting of a stripline connected to the third of said four junctions of said branch-line hydbrid;

a second high pass filter consisting of a stripline connected to the fourth of said four junctions of said branch-line hybrid;

a first varactor diode;

a first stripline interconnection for connecting said first high pass filter to said first varactor diode;

a second varactor diode;

a second stripline interconnection for connecting said second high pass filter to said second varactor diode;

said second stripline interconnection being one quarter wavelength longer than said first stripline interconnection;

a first low pass filter consisting of a stripline having an input adapted for connection to a source of secondary frequency signals;

a third stripline interconnection for connecting the output from said first low pass filter to said first stripline interconnection;

a second low pass filter consisting of a stripline having an input adapted for connection to a source of intermediate frequency signals;

a fourth stripline interconnection for connecting the output from said second low pass filter to said second stripline interconnection; and said first high pass filter plus said first stripline interconnection and said second high pass filter plus said second stripline interconnection being substantially parallel.

10. Apparatus set forth in claim 9 including:

a first isolating resistor connected between said first low pass filter and said input to said first low pass filter; and a second isolating resistor connected between said second low pass filter and said input to said second low pass filter.

11. Apparatus set forth in claim 10 including:

a first circulator connected between said first junction of said branch-line hybrid and said local oscillator signal source; and a second circulator connected between said second junction of said branch-line hybrid and said output terminal.

References Cited

UNITED STATES PATENTS

| | | |
|---|---|---|
| 2,868,966 | 1/1959 | Arditi. |
| 3,092,774 | 6/1963 | Peppiatt. |
| 3,310,748 | 3/1967 | Putnam. |
| 3,350,649 | 10/1967 | Blaeser. |

KATHLEEN H. CLAFFY, *Primary Examiner.*

BARRY PAUL SMITH, *Assistant Examiner.*

U.S. Cl. X.R.

332—43